United States Patent
Ono et al.

(10) Patent No.: US 10,500,897 B2
(45) Date of Patent: Dec. 10, 2019

(54) SUPPORTING STRUCTURE OF WHEEL SPEED SENSOR

(71) Applicant: HONDA MOTOR CO., LTD., Tokyo (JP)

(72) Inventors: Kazuhiko Ono, Tokyo (JP); Hiroshi Kurata, Tokyo (JP); Hiroaki Shibuya, Tokyo (JP); Shinpei Okazaki, Tokyo (JP); Daisuke Tabuchi, Tokyo (JP); Yoshiyuki Imai, Tokyo (JP); Akira Ogitani, Tokyo (JP); Naoyuki Yamate, Tokyo (JP); Shinichiro Kato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 108 days.

(21) Appl. No.: 15/561,607

(22) PCT Filed: Mar. 31, 2015

(86) PCT No.: PCT/JP2015/060217
§ 371 (c)(1),
(2) Date: Sep. 26, 2017

(87) PCT Pub. No.: WO2016/157439
PCT Pub. Date: Oct. 6, 2016

(65) Prior Publication Data
US 2018/0117961 A1    May 3, 2018

(51) Int. Cl.
*B60G 17/019* (2006.01)
*B62K 19/38* (2006.01)
(Continued)

(52) U.S. Cl.
CPC .... *B60B 27/0068* (2013.01); *B60G 17/01933* (2013.01); *B60T 8/1706* (2013.01);
(Continued)

(58) Field of Classification Search
CPC .... B60B 27/0068; B60T 8/1706; B62J 99/00; B62K 19/38; B62K 25/08; G01P 1/026; G01P 3/488; B60G 17/01933
See application file for complete search history.

(56) References Cited

U.S. PATENT DOCUMENTS

| 6,126,177 A * | 10/2000 | Steinert | B60G 17/01933 280/5.5 |
| 8,093,887 B2 * | 1/2012 | Iemura | B60T 8/171 324/207.25 |

(Continued)

FOREIGN PATENT DOCUMENTS

| JP | 2006-248296 | 9/2006 |
| JP | 2013-067388 | 4/2013 |

(Continued)

OTHER PUBLICATIONS

International Search Report, dated Jun. 30, 2015 (dated Jun. 30, 2015), 2 pages.

*Primary Examiner* — Helen C Kwok
(74) *Attorney, Agent, or Firm* — Rankin, Hill & Clark LLP

(57) ABSTRACT

A front wheel caliper bracket for supporting an axle is provided in a lower end portion of a front fork. A wheel speed sensor is mounted on the bracket. The wheel speed sensor includes a fixing section and a sensor section, and is mounted on a sensor mounting section of the bracket by a bolt. The sensor mounting section is integrally formed with a rotation regulating portion in a projecting fashion. When fastened by the bolt, a lateral part of the rotating wheel speed sensor comes into contact with the rotation regulating portion to regulate the rotation of the wheel speed sensor, so that the stress from the rotation regulating portion is not exerted directly on the sensor section.

11 Claims, 8 Drawing Sheets

(51) Int. Cl.
    *G01P 3/488*     (2006.01)
    *B60B 27/00*     (2006.01)
    *B62J 99/00*     (2009.01)
    *B60T 8/17*     (2006.01)
    *G01P 1/02*     (2006.01)
    *B62K 25/08*     (2006.01)

(52) U.S. Cl.
    CPC ............... *B62J 99/00* (2013.01); *B62K 19/38* (2013.01); *B62K 25/08* (2013.01); *G01P 1/026* (2013.01); *G01P 3/488* (2013.01); *B60G 2400/208* (2013.01); *B62J 2099/002* (2013.01); *F16C 2326/02* (2013.01)

(56) References Cited

U.S. PATENT DOCUMENTS

| | | | | |
|---|---|---|---|---|
| 2001/0002599 | A1* | 6/2001 | Apel | F02D 9/105 137/554 |
| 2002/0175574 | A1* | 11/2002 | Okazaki | H02K 3/50 310/68 B |
| 2007/0268013 | A1* | 11/2007 | Yamamoto | F16C 33/723 324/174 |
| 2015/0069826 | A1* | 3/2015 | Suzuki | F16C 33/768 301/109 |
| 2016/0054348 | A1* | 2/2016 | Kato | B60T 8/171 324/166 |
| 2017/0151833 | A1* | 6/2017 | Neutsch | B60B 1/003 |
| 2018/0043959 | A1* | 2/2018 | Yasuhara | B62L 1/00 |
| 2018/0056767 | A1* | 3/2018 | Dolgov | B60G 3/145 |

FOREIGN PATENT DOCUMENTS

| | | |
|---|---|---|
| JP | 2014-012525 | 1/2014 |
| JP | 2014-213818 | 11/2014 |
| WO | 2007/040044 | 4/2007 |
| WO | 2014/157352 | 10/2014 |

* cited by examiner

SUPPORTING STRUCTURE OF WHEEL SPEED SENSOR

TECHNICAL FIELD

The present invention relates to a supporting structure of a wheel speed sensor which is provided for detecting a wheel speed of a vehicle such as a two-wheeled motorcycle or the like.

BACKGROUND ART

In a patent reference 1, there is disclosed a structure in which a wheel speed sensor is supported by a bolt on a bracket for supporting a wheel axle. The wheel speed sensor is made of resin and includes an oblong fixing section to which a sensor cable is attached, and a sensor section passing through a sensor attachment hole of the bracket from the fixing section. Slit apertures of a pulsar ring arranged in an interior of the bracket are detected by a tip of the sensor section.

PRIOR ART REFERENCE

Patent reference 1: Japanese Patent No. 4,520,333.

DISCLOSURE OF THE INVENTION

Problem to be Solved by the Invention

The wheel speed sensor as disclosed in the patent reference 1, of the type that is supported by a single bolt on the bracket is required to be fixed in position so as not to be rotated at the time of fastening the bolt. Therefore, the sensor section is configured to be regulated the rotation in such a manner that the sensor section is inserted into the sensor attachment hole located in the bracket. However, in this configuration, a joint portion (a portion in the vicinity of an opening edge of the sensor attachment hole) of the sensor is subjected to stress, as a result that there is a possibility of deterioration in durability. In order to relieve such stress, it is conceivable that a relatively large clearance round is formed in the joint portion. However, since there is another requirement to compactify the wheel speed sensor, it is difficult to form the relatively large clearance round under such requirement. Moreover, in the method of regulating the rotation at the sensor section, a deflection is caused in the wheel speed sensor made of resin, so that there is a possibility of deterioration in accuracy of the attachment position of the sensor section.

Accordingly, the present invention has an objective of providing a supporting structure of the wheel speed sensor capable of regulating the rotation of the wheel speed sensor while preventing the stress from being directly exerted on the sensor section at the time of fastening, and capable of maintaining the accuracy of the attachment position of the sensor section in good condition.

Means for Solving the Problem

In order to solve the above described object, according to a first feature of the present invention, there is provided a supporting structure of a wheel speed sensor comprising a bracket (16, 22) for supporting an axle (17, 23) of a wheel, a wheel speed sensor (18) for detecting a rotational speed of the wheel, and a fastening member (43, 69) for mounting the wheel speed sensor (18) on a sensor mounting section (32, 65) provided on an outer surface of the bracket (16, 22), wherein the wheel speed sensor (18) includes a fixing section (40) which is fixed by the fastening member (43, 69) in such a manner that a seat surface (25) of the fixing section (40) intersecting with a direction of the axle makes contact with the sensor mounting section (32, 65) of the bracket (16, 22), and a sensor section (41) which extends from the fixing section in the direction of the axle, and the wheel speed sensor (18) is made of resin and formed integral with the fixing section (40) and the sensor section (41), wherein the bracket (16, 22) includes a rotation regulating portion (52, 68) for regulating a rotation of the wheel speed sensor (18), the rotation regulating portion (52, 68) projecting from the outer surface of the bracket (16, 22) to be engaged with an outer circumferential portion of the fixing section (40), and a protection wall (53, 70) for covering at least a portion of an outer circumference of the sensor section (41), and wherein a clearance (48, 71) is provided between the sensor section (41) and the protection wall (53, 70).

According to a second feature of the present invention, in addition to the first feature, the fixing section (40) is provided with a through hole (40a) through which the fastening member (43, 69) passes, wherein the through hole (40a) and the sensor section (41) are arranged side by side in a longitudinal direction of the fixing section (40), and the rotation regulating portion (52, 68) comes in contact with a part overlapping with the sensor section (41) in the longitudinal direction of the fixing section (40).

According to a third feature of the present invention, in addition to the first or second feature, the bracket (22) includes a rib (62) which extends radially from a part through which the axle (23) passes and which is formed thicker in the direction of the axle (23) from the outer surface, and the sensor mounting section (65) and the rotation regulating portion (68) are formed in the rib (62).

According to a fourth feature of the present invention, in addition to the first or second feature, the bracket (16) is configured to carry the axle (17) of a front wheel and to support a lower end of a front fork (13) at the rear of the axle (17), wherein the wheel speed sensor (18) is arranged in front of the front fork (13), and the rotation regulating portion (52) is arranged in front of the sensor mounting section (32) of the bracket (16) so as to cover the fixing section (40).

According to a fifth feature of the present invention, in addition to any one of the first through fourth features, an outer circumferential portion of the wheel speed sensor (18) which makes contact with the rotation regulating portion (52, 68) is formed in parallel with the direction of the axle, and a wall surface of the rotation regulating portion (52, 68) which makes contact with the wheel speed sensor (18) is formed in parallel with the direction of the axle.

According to a sixth feature of the present invention, in addition to the first feature, the sensor section (41) is formed in a cylindrical shape and extends in parallel with the direction of the axle, and the bracket (16, 22) includes a sensor mounting hole (51, 67) through which the sensor section (41) passes, wherein the protection wall (53, 70) is formed of an inner circumferential surface of the sensor mounting hole (51, 67) and covers an inner end (41) in an axial direction of the sensor section (41).

Effects of the Invention

According to the first feature of the present invention, since the rotation of the wheel speed sensor is regulated by the engagement between the fixing section of the wheel speed sensor and the rotation regulating portion of the bracket, and the clearance is provided between the sensor section and the protection wall, the position of the wheel speed sensor is determined by only the fixing section and the bracket, and the sensor section does not regulate the rotation. Therefore, the sensor section is not subjected directly to the stress due to the regulation of the rotation, so that the durability of the wheel speed sensor can be improved.

In addition, since the deflection of a resin part can be lessened, the accuracy of a mounting position of the sensor section can be maintained in good condition.

According to the second feature of the present invention, since the rotation regulating portion is arranged in a position spaced apart from the fastening member so as to regulate the rotation, the positional accuracy in the rotational direction is maintained in good condition, and the regulation of the rotation is performed in a position close to the sensor section, whereby the interference between the sensor section and the protection wall surrounding the sensor section can be prevented more securely.

According to the third feature of the present invention, since the sensor mounting section and the rotation regulating portion are formed in the rib which projects from the bracket surface, the rotation regulating portion and the seat surface with which the wheel speed sensor makes contact can be formed in excellent workability. In addition, the rotation regulating portion can be compactified by being reinforced by the rib.

According to the fourth feature of the present invention, since the wheel speed sensor which is arranged forwardly of the front fork is covered from the front side with the rotation regulating portion, it is possible to dispense with a separate protective member for protecting the wheel speed sensor, and the number of component parts can be reduced.

According to the fifth feature of the present invention, since a draft of a molding die is not provided in the fixing section made of resin, a contacting area with the rotation regulating portion is increased, whereby a load can be dispersed effectively.

According to the sixth feature of the present invention, since the protection wall is formed of the inner circumferential surface of the sensor mounting hole and covers the inner end in the axial direction of the sensor section, the inner end in the axial direction of the sensor section can be protected from flying stones and the like.

BEST MODE FOR CARRYING OUT THE INVENTION

Figure 1:
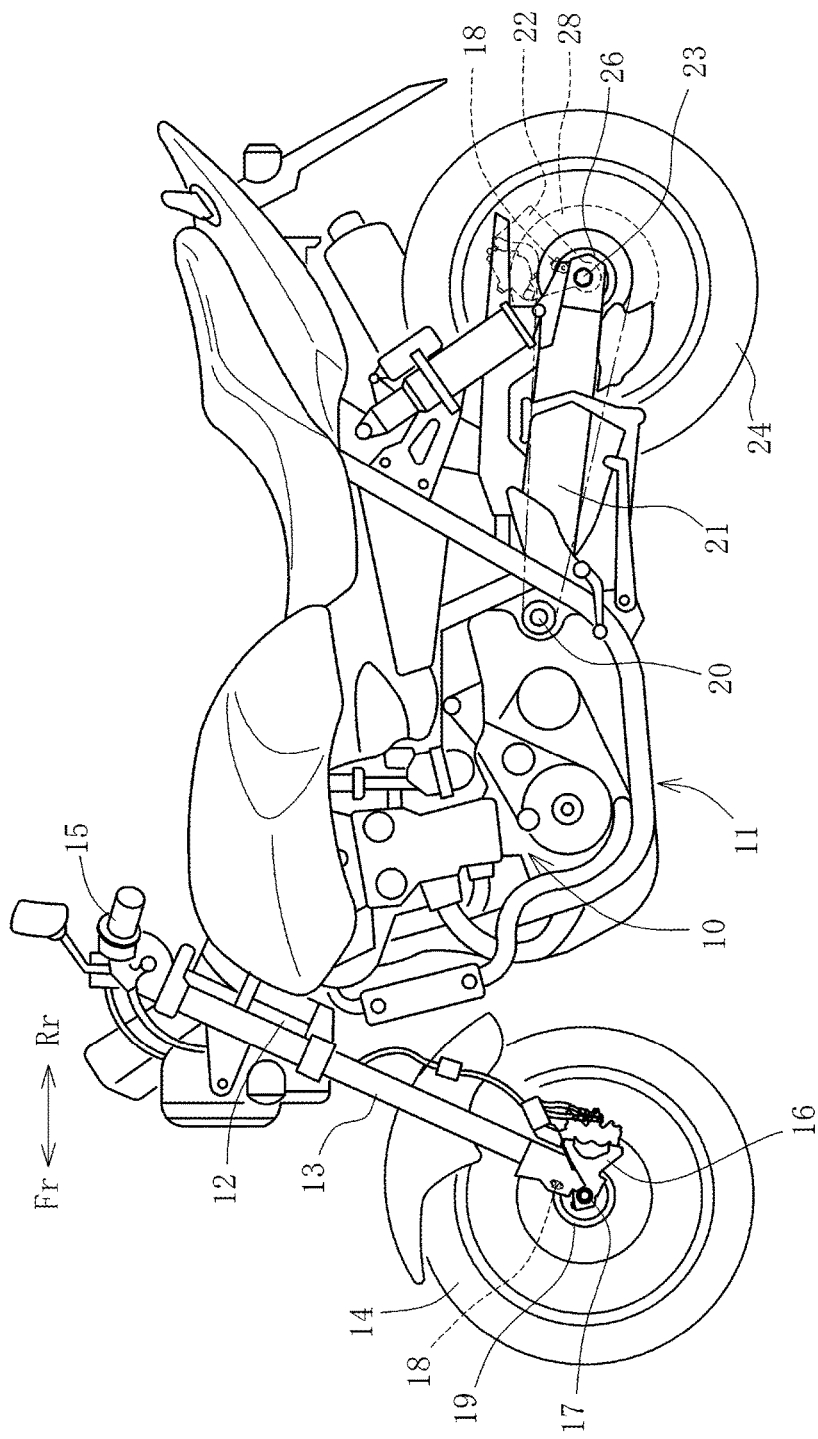
FIG. 1 is a left side view of a two-wheeled motorcycle in accordance with an embodiment of the present invention.

Hereinafter, the embodiment of the present invention will be explained with reference to accompanying drawings.

In the following description, the orientation of a vehicle such as front, rear, left, right, top and bottom is designated based on a use state of the vehicle and, to be concrete, based on a traveling direction of the vehicle. Moreover, an axial direction designates a direction of an axle or a direction parallel to the axle. An inside (inward direction) in the axial direction designates a center side of a vehicle body in the axial direction. Further, in the drawings, there are designated an arrow Fr indicating a forward direction, an arrow Rr indicating a rear direction, and an arrow IN indicating the inside in the axial direction as occasion demands.

Referring to FIG. 1, an engine 10 is carried by a vehicle body frame 11 in the middle of the vehicle body. A pair of left and right front forks 13 is rotatably supported by a head pipe 12 formed at a front end of the vehicle body frame 11, and a front wheel 14 is carried on lower end portions of the front forks 13. The front wheel 14 is steered by a handle 15 which is connected to upper end portions of the front forks 13.

The front wheel 14 is supported through an axle 17 by a front wheel caliper bracket (corresponding to a bracket of the present invention) 16 which is located on the lower end portions of the front forks 13. A wheel speed sensor 18 is provided in the front wheel caliper bracket 16 and configured to detect a rotation of a pulsar ring 19 which is arranged coaxial with the axle 17.

A rear swing arm 21 is located in the rear of the engine 10 and swingably supported at a front end thereof by a pivot shaft 20. A rear wheel 24 is carried through an axle 23 by a rear end portion of the rear swing arm 21. A rear wheel caliper bracket 22 is supported on the axle 23, and a wheel speed sensor 18 is provided in the rear wheel caliper bracket 22 in such a way as to detect a rotation of a pulsar ring 26 which is arranged coaxial with the axle 23.

Figure 2:
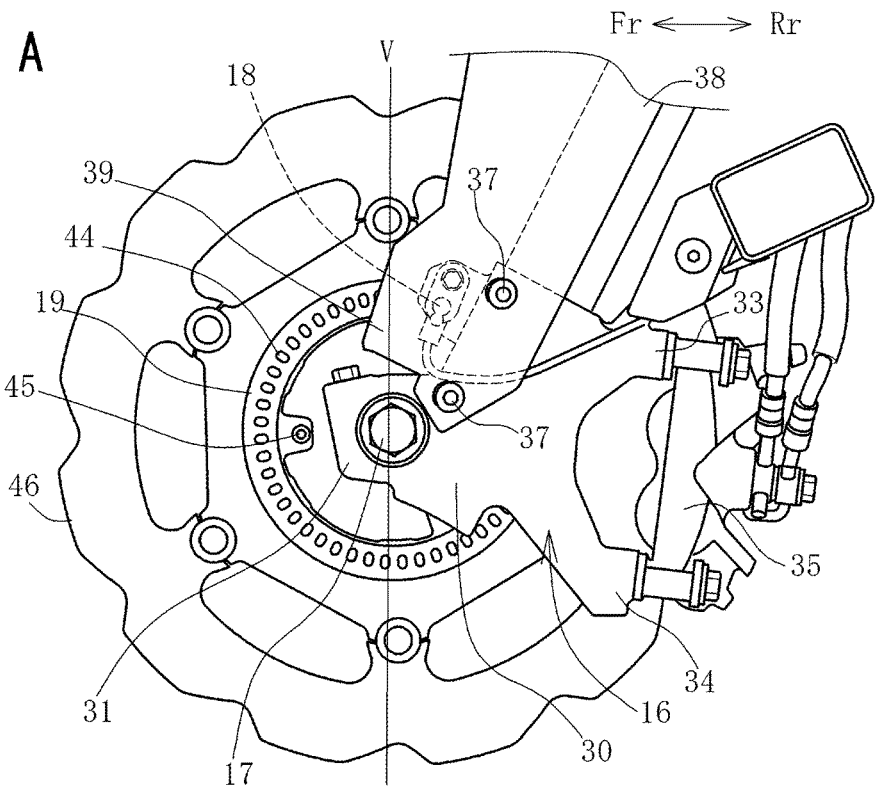
FIG. 2 is an enlarged side view of a part of a front wheel caliper bracket.
Figure 2:
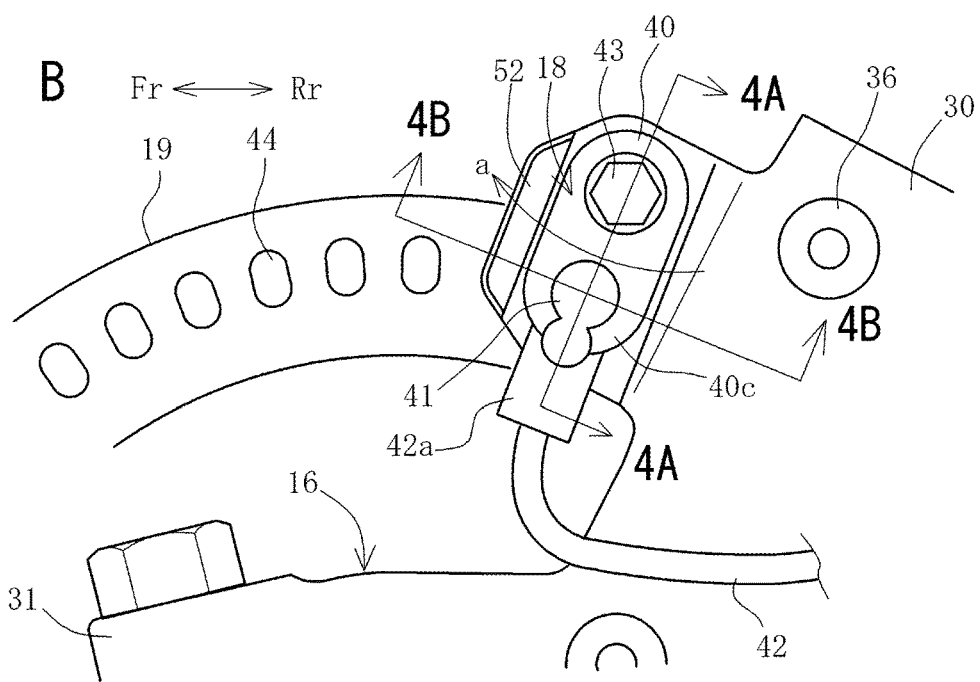
Figure 3:
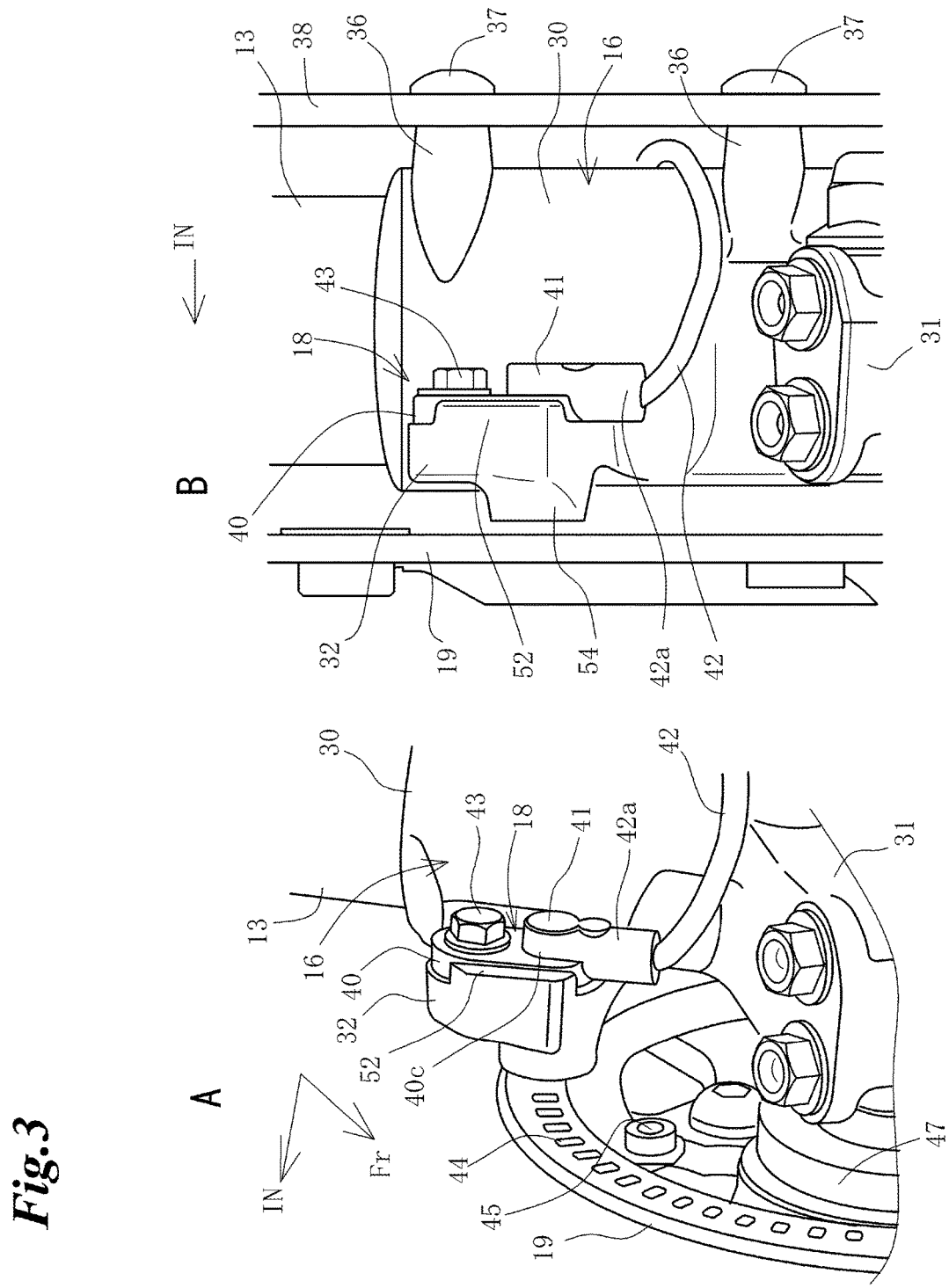
FIG. 3 is a view showing a mounting state of a wheel speed sensor of a front wheel.
Figure 4:
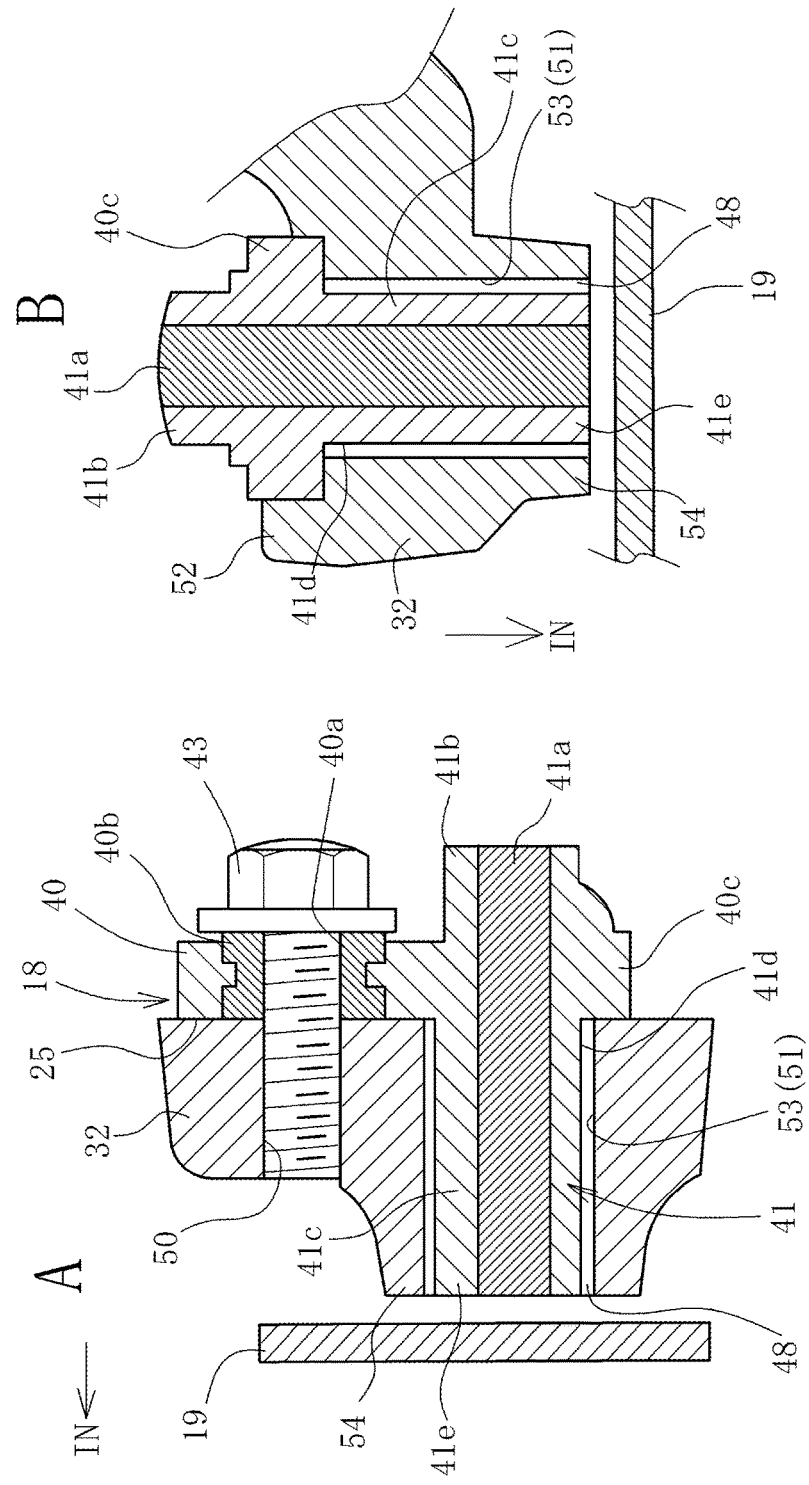
FIG. 4 is a cross sectional view showing the mounting state of the wheel speed sensor of the front wheel.
Figure 5:
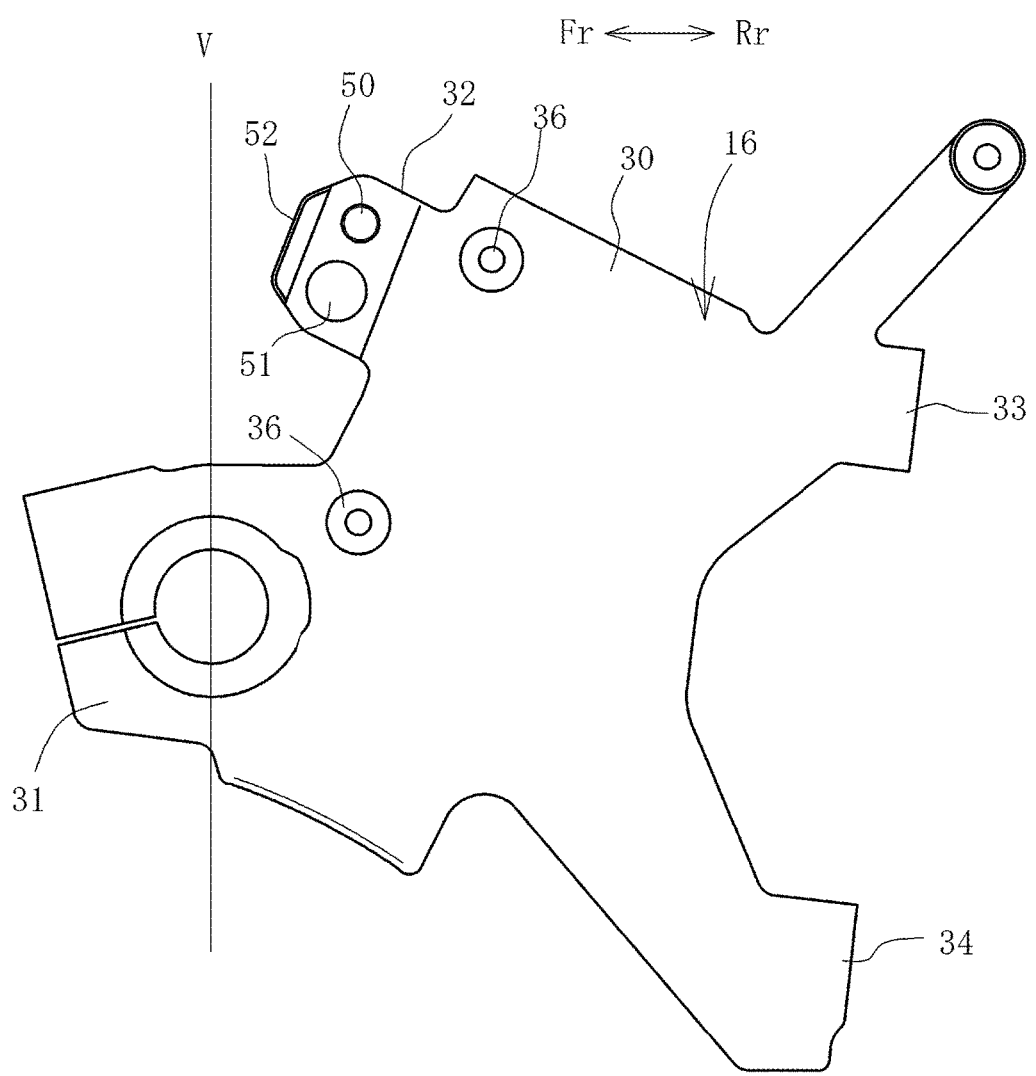
FIG. 5 is a side view of the front wheel caliper bracket.

Next, a mounting structure of the wheel speed sensor 18 on the front wheel side will be explained in detail. FIG. 2-A shows a part of the front wheel caliper bracket of FIG. 1 in an enlarged scale, and FIG. 2-B is a side view showing the mounting structure of the wheel speed sensor 18 in an enlarged scale in a condition where a fork cover, a brake caliper and the like are removed from FIG. 2-A. FIG. 3 shows the mounting structure of the wheel speed sensor 18 on the front wheel side, in which FIG. 3-A is a perspective view when viewed from an obliquely forward direction, and FIG. 3-B is a front view. FIG. 4-A is a cross sectional view taken on line 4A-4A of FIG. 2-B, and FIG. 4-B is a cross sectional view taken on line 4B-4B of FIG. 2-B. FIG. 5 is a side view of the front wheel caliper bracket 16.

First, the front wheel caliper bracket 16 will be explained with reference to FIG. 5. The front wheel caliper bracket 16 is made of metal formed by casting or the like. In the middle of the front wheel caliper bracket 16 there is provided a barrel section 30 in which the lower end portion of the front fork 13 is engaged, and in a lower part thereof there is provided a forwardly projecting axle holder 31 on which the axle 17 is carried.

A sensor mounting section 32 is located above the axle holder 31 and formed in a forwardly projecting fashion. The wheel speed sensor 18 is mounted on this sensor mounting section 32. Caliper mounting sections 33, 34 project to the rear of the barrel section 30, and a caliper 35 of a front wheel brake (see FIG. 2-A) is mounted on the caliper mounting sections 33, 34. Bosses 36, 36 are formed on a surface of the barrel section 30.

A female screw hole 50 for mounting the wheel speed sensor 18 by a bolt is provided in the sensor mounting section 32, and a sensor mounting hole 51 which is larger than the female screw hole 50 is formed in the vicinity of the female screw hole 50 so as to extend through the sensor mounting section 32. A sensor section 41 is fitted or engaged in the sensor mounting hole 51.

The female screw hole 50 and the sensor mounting hole 51 are arranged side by side in the upward and downward direction of the drawing, and a rotation regulating portion 52 is formed on the outside (front side) of these holes 50, 51 in a projecting fashion. The rotation regulating portion 52 is formed in a front end portion of the sensor mounting section 32 and on a forward side in the direction (the direction of an arrow a in FIG. 2-B) of rotation in which the wheel speed sensor 18 is rotated at the time it is fastened by the bolt.

As shown in FIG. 2-A, a fork cover 38 overlaps in part with the front wheel caliper bracket 16 from above and is fastened to the bosses 36, 36 by bolts 37, 37. A sensor cover 39 is formed integral with the fork cover 38 and projects forwardly so as to cover the wheel speed sensor 18 from an outer lateral side thereof.

The wheel speed sensor 18 is positioned above the axle 17 and in a region between a vertical line V passing the axle 17 and a front part of the barrel section 30.

The wheel speed sensor 18 is arranged in the vicinity of a lateral surface of the pulsar ring 19 which is concentric with the axle 17 of the front wheel 14, and configured to detect slit apertures 44 of the pulsar ring 19. The pulsar ring 19 is mounted on a hub 47 (FIG. 3-A) of the front wheel 14 by bolts 45 and arranged coaxial with the axle 17. In addition, a brake disc 46 of the front brake is fixed on the hub 47 on an outer circumferential side of the pulsar ring 19 and arranged coaxial with the pulsar ring 19.

As shown in FIG. 2-B, the wheel speed sensor 18 is a resin part which is integrally formed with a fixing section 40 and a sensor section 41. A sensor 41*a* (see FIG. 4-A) is integrated into the sensor section 41 by mold forming.

A sensor cable 42 extends from the sensor section 41 and is configured to output a wheel speed signal detected by the sensor section 41 to an ECU (not shown) functioning as an electronic control system.

The fixing section 40 is provided with a seat surface 25 (FIG. 4) which intersects with the direction of the axle. The seat surface 25 is placed on the sensor mounting section 32 and removably mounted on the sensor mounting section 32 by a bolt 43.

The wheel speed sensor 18 is integrally formed with the fixing section 40 and the sensor section 41 and has an oblong shape when viewed in the axial direction (FIG. 2-B). The fixing section 40 is formed with a through hole 40*a* (FIG. 4-A) through which the bolt 43 passes. A cord connecting portion 42*a* from which the sensor cable 42 extends is formed on a lateral side of the sensor section 41 in a projecting fashion.

The sensor section 41 projects toward a vehicle center in parallel with the axial direction of the axle 17 and faces the lateral surface of an outer circumference of the pulsar ring 19.

In the lateral surface of the pulsar ring 19 there are formed at regular intervals the slit apertures 44 which pass through in the axial direction. When pulse signals are produced every time the slit apertures 44 pass, the sensor section 41 detects the number of the slit apertures 44 which pass in a predetermined unit time. Based on this step, the wheel speed is detected.

As shown in FIGS. 3A and 3B, the rotation regulating portion 52 is formed integral with the sensor mounting section 32 and projects laterally outwardly from the sensor mounting section 32 so as to regulate the rotation of the wheel speed sensor 18.

As shown in FIG. 4-A, the wheel speed sensor 18 is formed with the relatively thin fixing section 40 and the cylindrical sensor section 41. A collar 40*b* is integrated into the fixing section 40. A surface of the collar 40*b* projects more than a surface of a surrounding part of the fixing section 40. Therefore, the axial force of the bolt 43 is received by the collar 40*b*, and the stress due to the axial force of the bolt 43 is not applied excessively to the surrounding part of the fixing section 40 made of resin.

The sensor section 41 projects larger in length than the fixing section 40 in the direction of the vehicle center and extends in parallel with the axial direction. The sensor 41*a* is integrated in an interior of the sensor section 41.

An outer diameter of a main body portion 41*c* (to be referred to later) of the sensor section 41 is slightly smaller than an inner diameter of the sensor mounting hole 51 of the sensor mounting section 32, so that a clearance 48 is able to be formed between the main body portion 41*c* and an inner circumferential surface of the sensor mounting hole 51 when the sensor 41 is engaged in the sensor mounting hole 51. In this drawing, the clearance 48 is depicted in an exaggerated way (the same shall apply to other drawings).

The inner circumferential surface of the sensor mounting hole 51 is formed as a protection wall 53 which surrounds and covers an outer circumference of the sensor section 41.

As shown in FIG. 4-B, an outer end portion in the axial direction of the sensor section 41 is integrally formed with a flange portion 40*c* which projects laterally from the sensor section 41. However, this flange portion 40*c* is an extending portion of the fixing section 40 and has the same width as the fixing section 40. In other words, the sensor section 41 is formed in such a manner as to extend in the left and right direction of FIG. 4-A at an end portion in the longitudinal direction (in the direction in which the bolt 43 and the sensor section 41 are arranged side by side in FIG. 2-B when viewed in the axial direction of the wheel speed sensor 18) of the oblong fixing section 40.

The main body portion 41*c* of the sensor section 41 to be fitted into the sensor mounting hole 51 is formed by a portion which extends more inwardly in the axial direction than the flange portion 40*c*. A connecting portion between the main body portion 41*c* and the flange portion 40*c* is formed as a joint portion 41*d*.

An inner end portion 41*e* in the axial direction of the sensor section 41 projects inwardly in the axial direction, and a tip of the inner end portion 41*e* is close to an opposed surface of the pulsar ring 19. A circumference of the inner end portion 41*e* in the axial direction of the sensor section 41 is surrounded by a projecting portion 54. The projecting portion 54 is a cylindrical portion which is integrally formed with the sensor mounting section 32 in a projecting fashion therefrom. A tip of the projecting portion 54 has substantially the same height as the tip of the inner end portion 41*e* in the axial direction of the sensor section 41 and is configured to protect the inner end portion 41*e* of the sensor section 41.

By the way, if the tip of the projecting portion 54 is higher than the tip of the inner end portion 41*e* in the axial direction of the sensor section 41, the inner end portion 41*e* can be protected more effectively.

Further, the projecting portion 54 is formed with a through hole surrounding the inner end portion 41*e* in the axial direction of the sensor section 41. This through hole is an extending portion which is continuous with the sensor mounting hole 51, and an inner circumferential surface of the through hole is formed as a part of the protection wall 53.

In addition, a clearance is formed also between the through hole and an outer circumferential part of the inner end portion 41e in the axial direction of the sensor section 41.

A lateral surface of the flange portion 40c makes contact with the rotation regulating portion 52. Each of contact surfaces of the flange portion 40c and the rotation regulating portion 52 is in parallel with the axial direction and has a draft at an angle 0°. The main body portion 41c of the sensor section 41 projects downwardly of the rotation regulating portion 52. Therefore, when the wheel speed sensor 18 is rotated relative to the sensor mounting section 32 at the time of being fastened by the bolt 43, the flange portion 40c which is the extending part of the fixing section 40 comes into contact with the rotation regulating portion 52.

Like this, in the case where the wheel speed sensor 18 is supported on the front wheel caliper bracket 16, the stress is not exerted directly on the sensor section 41 when the wheel speed sensor 18 is fixed in the sensor mounting section 32.

Namely, when the main body portion 41c of the sensor section 40 is fitted into the sensor mounting hole 51, and the through hole 40a of the fixing section 40 is placed on the female screw hole 50 and fastened by the bolt 43, the wheel speed sensor 18 is mounted on the sensor mounting section 32 by a single bolt 43.

Although at the time of being fastened by the bolt 43, the wheel speed sensor 18 is about to be rotated around the bolt 43 in the direction indicated by the arrow a (FIG. 2-B), the flange portion 40c comes into contact with the rotation regulating portion 52 whereby the rotation is regulated. At that time, the stress due to the regulation of the rotation is applied from the rotation regulating portion 52 to the flange portion 40c. This stress is dispersed from the flange portion 40c to the whole of the fixing section 40.

However, since the sensor section 41 is formed with a step between itself and the flange portion 40c and enters inwardly of the flange portion 40c, it does not make direct contact with the rotation regulating portion 52. Moreover, due to the clearance 48 within the sensor mounting hole 51, the main body portion 41c does not make direct contact with the protection wall 53 forming the inner circumferential wall of the sensor mounting hole 51. Therefore, the stress is not exerted directly on the sensor section 41, and also the stress concentration on the joint portion 41d is reduced.

As a result, the position of the wheel speed sensor 18 is able to be determined by only the fixing section 40 and the rotation regulating portion 52 of the front wheel caliper bracket 16, and the rotation at the time of being fastened by the bolt is able to be regulated by the engagement between the flange portion 40c and the rotation regulating portion 52. At that time, since the rotation is not regulated by the sensor section 41, the stress due to the rotation regulation is not exerted directly on the sensor section 41, whereby it is possible to improve the durability.

In addition, since only the fixing section 40 contacts the rotation regulating portion 52 and the sensor section 41 does not contact the front wheel caliper bracket 16 side although the wheel speed sensor 18 is made of resin, the deflection of the resin member can be lessened, and the accuracy of the mounting position of the sensor section 41 can be kept in good condition.

Further, since the rotation regulating portion 52 extends to the lateral side of the sensor mounting hole 51 spaced apart from the female screw hole 50 formed as a fastening portion, and the rotation regulation is performed in a position close to the sensor section 41, the sensor section 41 can be accurately fixed in position, the accuracy of the position in the direction of the rotation can be kept in good condition. In addition, the interference between the sensor section 41 (the main body portion 41c) and the protection wall 53 formed by the inner circumferential surface of the sensor mounting hole 51 can be prevented more accurately.

Moreover, since the rotation regulating portion 52 extends longer along substantially the whole length in the longitudinal direction of the sensor mounting section 32, substantially the whole length in the longitudinal direction of the fixing section 40 can contact the rotation regulating portion 52, so that the local stress concentration can be reduced more effectively.

Further, although the wheel speed sensor 18 is arranged forwardly of the front fork 13, it is covered with the rotation regulating portion 52 from the front side. Therefore, the wheel speed sensor 18 can be protected by the rotation regulating portion 52. Then, since the separate protection member is not required, the number of component parts can be reduced.

Further, since the draft of the molding die is not provided in the fixing section 40 made of resin, a contacting area with the rotation regulating portion 52 is increased, whereby the load in a contacting region can be dispersed effectively.

Further, since the projecting portion 54 provided in the sensor mounting section 32 covers the inner end portion 41e in the axial direction of the sensor section 41, the inner end portion 41e in the axial direction of the sensor section 41 can be protected from flying stones and the like by the projecting portion 54. Therefore, there is no need for the inner end portion 41e in the axial direction of the sensor section 41 to provide the metal protection member, whereby the sensor section can be compactified.

Figure 6:
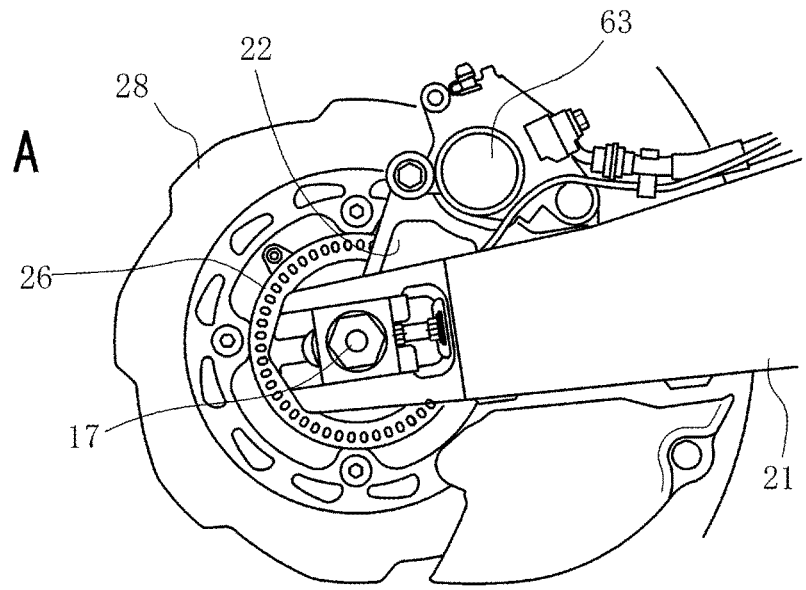
FIG. 6 is an enlarged side view of a part of a rear wheel caliper bracket.
Figure 6:
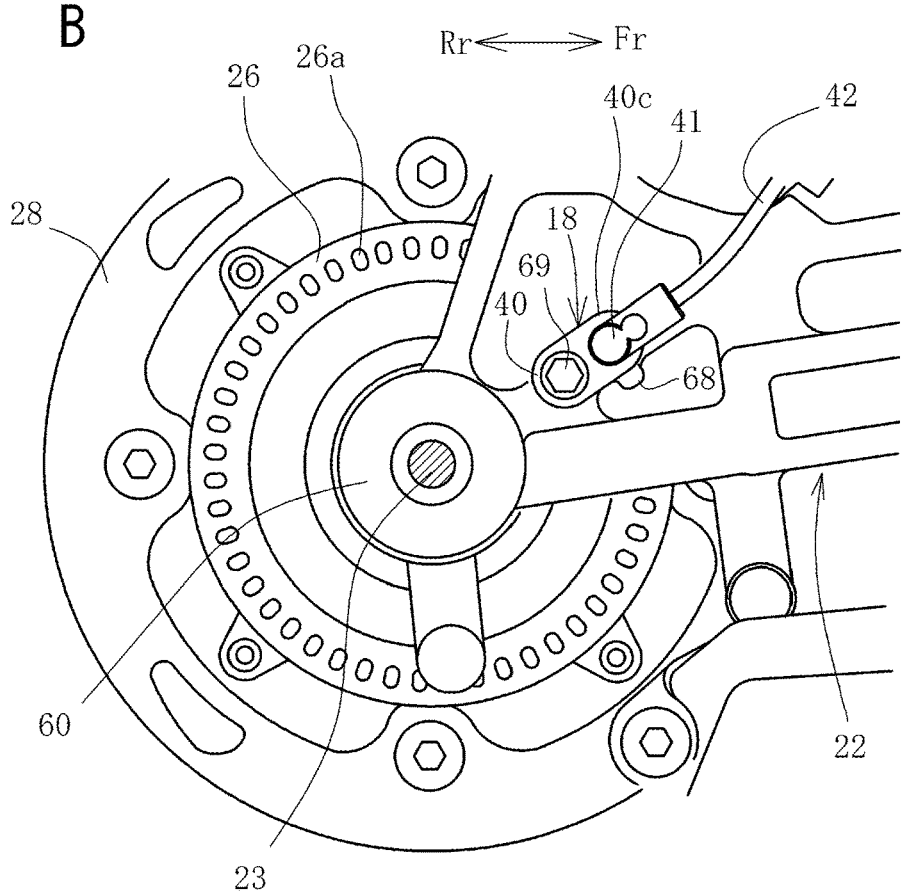
Figure 7:
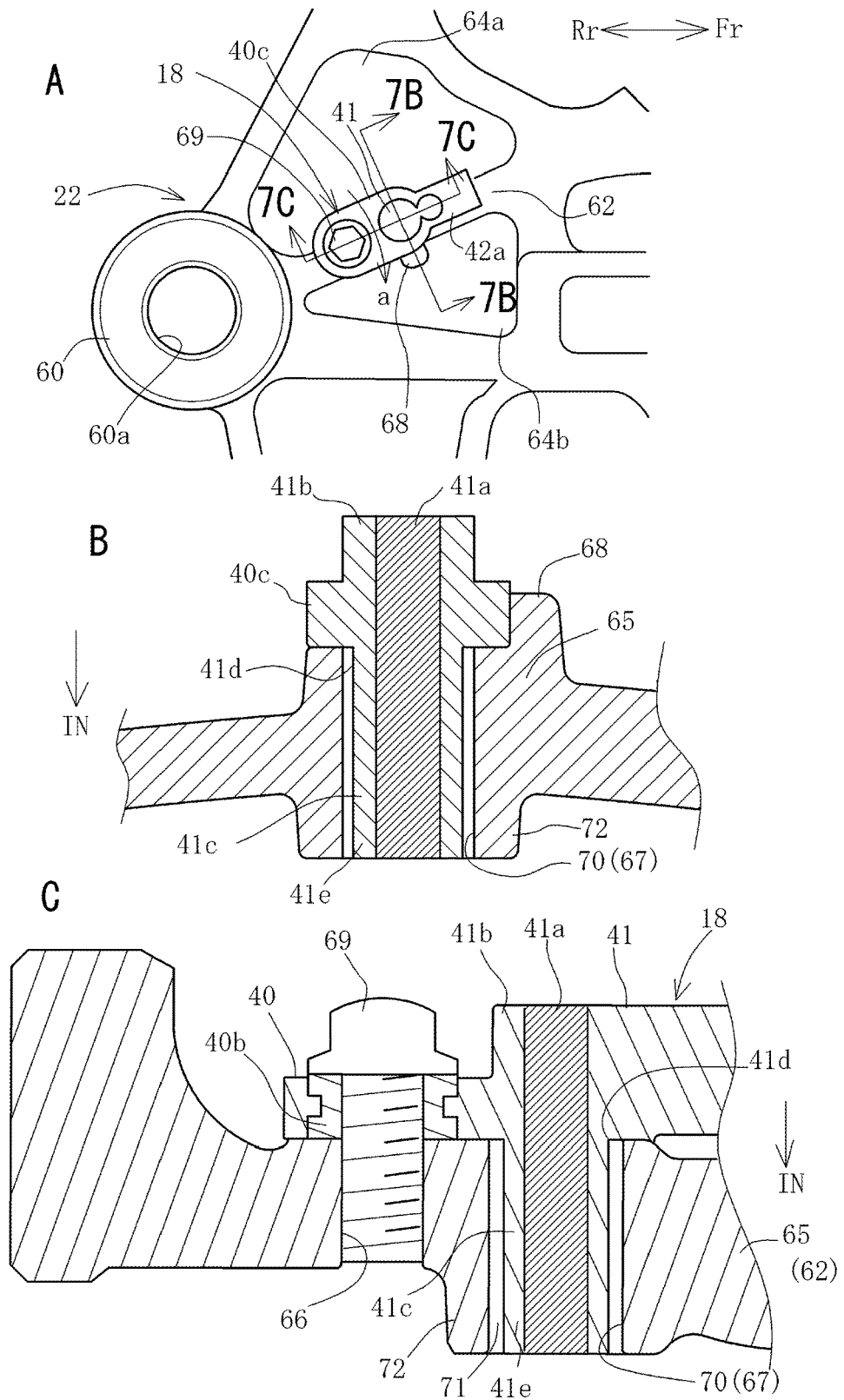
FIG. 7 is a view showing a mounting state of a wheel speed sensor of a rear wheel.
Figure 8:
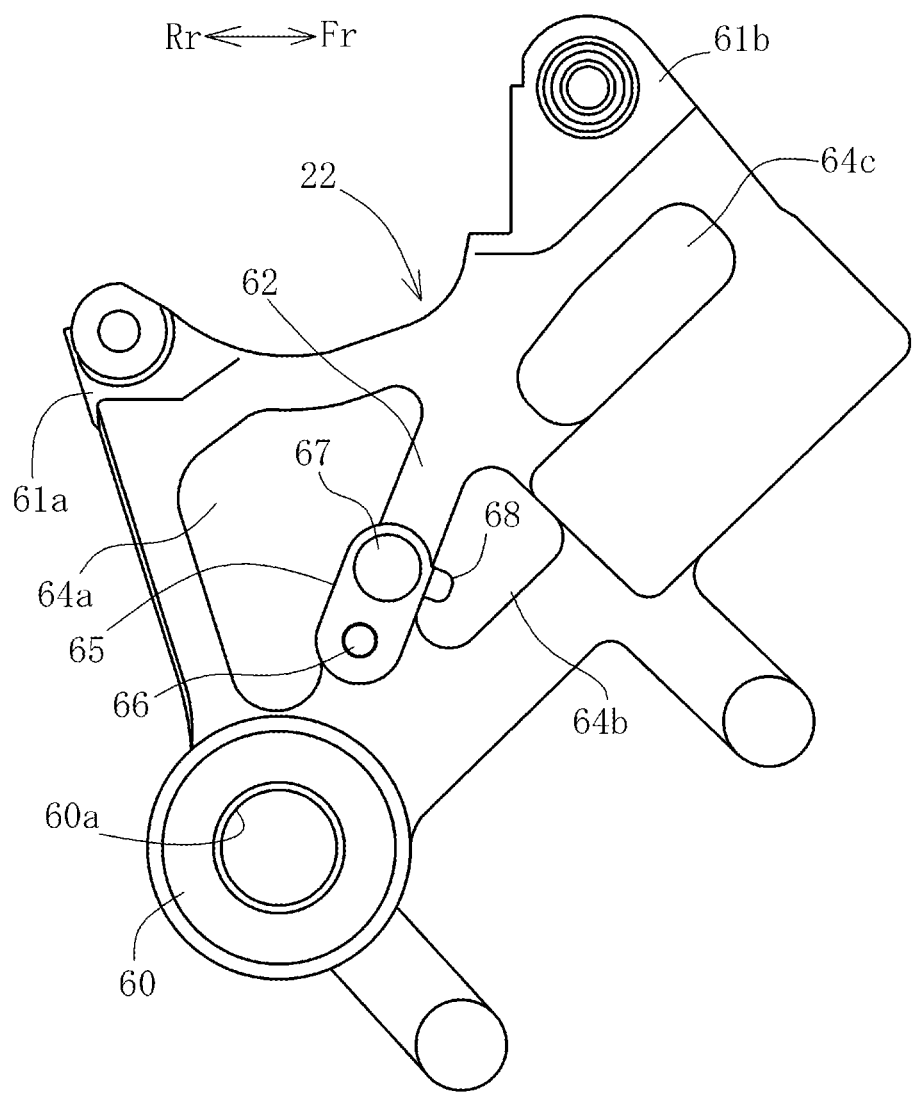
FIG. 8 is a side view of the rear wheel caliper bracket.

Next, the mounting structure of the wheel speed sensor 18 on the rear wheel side will be explained in detail. FIG. 6-A shows a part of the rear wheel caliper bracket 22 of FIG. 1 in an enlarged scale, and FIG. 6-B is a side view showing the mounting state of the wheel speed sensor 18 in an enlarged scale in a condition where the rear swing arm 21, a brake caliper and the like are removed from FIG. 6-A. FIG. 7-A is a side view showing the mounting state of a rear wheel speed sensor on the rear wheel caliper bracket 22, FIG. 7-B is a cross sectional view taken on line 7B-7B of FIG. 7-A, and FIG. 7-C is a cross sectional view taken on line 7C-7C of FIG. 7-A. FIG. 8 is a side view of the rear wheel caliper bracket 22.

As shown in FIG. 8, the rear wheel caliper bracket 22 is made of cast metal and integrally provided with a rear wheel holder 60 and caliper supporting sections 61a and 61b. An axle hole 60a is provided in the wheel holder 60, and the rear wheel caliper bracket 22 is carried on the axle 23 by fitting the axle 23 through the axle hole 60a. A rear wheel brake caliper 63 (FIG. 6-A) is attached on the caliper supporting sections 61a and 61b.

Further, there are provided lightening holes 64a, 64b and 64c. A rib 62 is provided between the lightening holes 64a and 64b. This rib 62 extends from a circumference of the axle hole 60a in the radial direction of the axle hole 60a and is formed thicker in the axial direction from an outer surface of the rear wheel caliper bracket 22.

A sensor mounting section 65 of the wheel speed sensor 18 is provided in the rib 62. The sensor mounting section 65 is of oblong shape and is provided with a female screw hole 66 and a sensor mounting hole 67 into which the sensor section 41 is fitted. A rotation regulating portion 68 is formed on a lateral side of the sensor mounting hole 67 in a state of projecting outwardly in the axle direction (in the upward direction of FIG. 7-B). The sensor mounting section 65 has opposed edge portions in the longitudinal direction thereof, and the rotation regulating portion 68 is formed in the edge portion of the sensor mounting section 65 located on a forward side of the direction of rotation (the direction indicated by an arrow a in FIG. 7-A) when the wheel speed sensor 18 is fastened by a bolt 69.

As shown in FIG. 7-B, a lateral surface of a flange portion 40c of the sensor section 41 makes contact with the rotation regulating portion 68 so as to regulate the rotation of the wheel speed sensor 18.

The flange portion 40c is formed as a step with respect to the sensor section 41. The rotation regulating portion 68 contacts the flange portion 40c and is configured so as not to contact the sensor section 41.

In FIGS. 6-A and 6-B, a reference character 26 designates a pulsar ring, 26a designates slit apertures, and 28 designates a brake disc for a rear brake system.

A height of the rotation regulating portion 68 which comes into contact with the flange portion 40c is slightly lower than an upper surface in an illustrated state of the flange portion 40c. Each contacting surface of the flange portion 40c and the rotation regulating portion 68 is a vertical surface without draft. In addition, an inner circumferential surface of the sensor mounting hole 67 is a vertical surface without draft.

As shown in FIG. 7-C, fastened to the female screw hole 66 is a bolt 69 which passes through a through hole 40a formed in the fixing section 40 of the wheel speed sensor 18. The fixing section 40 of the wheel speed sensor 18 is fixed on the sensor mounting section 65 by the bolt 69. In a similar way to the front wheel side (FIG. 4-A), a surface of a collar 40b provided in the fixing section 40 projects more than a surrounding part, so as not to exert the stress due to the axial force of the bolt 69 excessively on the surrounding resin part.

Then, a main body portion 41c of the sensor section 41 of the wheel speed sensor 18 is fitted into the sensor mounting hole 67.

Similarly to the front wheel speed sensor 18 side, a protection wall 70 is formed by the sensor section 40 and the sensor mounting hole 67, and a clearance 71 is formed between the protection wall 70 and an outer circumference of the main body portion 41c of the sensor section 41.

An inner end portion 41e in the axial direction of the sensor section 41 is surrounded by a projecting portion 72 which is formed integral with the rib 62. The projecting portion 72 is of cylindrical shape, and a tip of the projecting portion 72 has substantially the same height as a tip of the inner end portion 41e in the axial direction of the sensor section 41. Moreover, in the projecting portion 72 there is formed a hole which is continuous with the sensor mounting hole 67. The clearance 71 is also formed between the projecting portion 71 and an outer circumferential part of the inner end portion 41e in the axial direction of the sensor section 41.

With this construction, in a similar way to the front wheel side, the flange portion 40c of the fixing section 40 comes into contact with the rotation regulating portion 68 thereby to regulate the rotation of the wheel speed sensor 18 when the wheel speed sensor 18 is fastened and fixed to the sensor mounting section 65 of the rear wheel caliper bracket 22 by a single bolt 69. Moreover, the stress is not exerted directly on the sensor section 41, and the durability relative to the sensor section 41 is improved. In addition, the accuracy of detection is improved by positioning the sensor section 41 accurately, and the sensor section 41 is compactified by covering the inner end portion 41e in the axial direction of the sensor section 41 with the projecting portion 72.

Further, similarly to the front wheel side, the lateral surface of the flange portion 40c of the fixing section 40 and the contacting surface of the rotation regulating portion 68 are configured so as not to provide the draft of the molding die, so that an area which is in contact with the rotation regulating portion 52 is increased, whereby the load in a contacting region is dispersed effectively.

Furthermore, on the rear wheel side, since the rotation regulating portion 68 and the sensor mounting section 65 are provided in the rib 62 which projects from the surface of the rear wheel caliper bracket 22, it is possible to obtain a good workability with respect to the rotation regulating portion 68 and a seat surface on the sensor mounting section 65 with which a seat surface 25 of the wheel speed sensor 18 makes contact. In addition, since the rotation regulating portion 68 is reinforced by the rib 62, it can be compactified.

By the way, the present invention is not limited to the above embodiments. For example, the protection wall 53 (70) is not necessarily formed by the inner circumferential wall of the sensor mounting hole 51 (67) but may be formed by providing a wall surface for exclusive use on the bracket side. Then, without covering the whole of the sensor section 41, the protection wall may be configured so as to cover at least a part of the sensor section 41. In addition, the projecting portion 54 (72) is not necessarily required.

Further, the fastening means for fixing the wheel speed sensor 18 is not limited to the bolt 43 (69), it is possible to use another means for rotating the wheel speed sensor 18 at the time of fastening.

What is claimed is:

1. A supporting structure of a wheel speed sensor comprising:
   a bracket for supporting an axle of a wheel, the bracket including a sensor mounting section on an outer surface of the bracket,
   the wheel speed sensor for detecting a rotational speed of the wheel, the wheel speed sensor including:
      a fixing section fixed to the sensor mounting section, the fixing section having a seat surface extending in a direction that intersects with a direction of the axle and is in contact with the sensor mounting section, and
      a sensor section extending from the fixing section in the direction of the axle,
      wherein the fixing section and the sensor section are made of resin, and the fixing section is integrally formed with the sensor section; and
   a fastening member;
   contacting and fixing the seat surface of the fixing section to the sensor mounting section of the bracket,
   wherein the bracket further includes,
      a rotation regulating portion for regulating a rotation of the wheel speed sensor, the rotation regulating portion projecting from the outer surface of the bracket to be engaged with an outer circumferential portion of the fixing section, and
      a protection wall for covering at least a portion of an outer circumference of the sensor section via a clearance.

2. The supporting structure of a wheel speed sensor according to claim 1, wherein the fixing section is provided with a through hole through which the fastening member passes, wherein the through hole and the sensor section are arranged side by side in a longitudinal direction of the fixing section, and the rotation regulating portion comes in contact with a part located in the longitudinal direction of the fixing section and overlapping with the sensor section.

3. The supporting structure of a wheel speed sensor according to claim 1, wherein the bracket includes a rib which extends radially from a part through which the axle passes and which is formed thicker in the direction of the axle from the outer surface, and the sensor mounting section and the rotation regulating portion are formed in the rib.

4. The supporting structure of a wheel speed sensor according to claim 1, wherein the bracket is configured to carry the axle of a front wheel and support a lower end of a front fork at a rear of the axle, and wherein the wheel speed sensor is arranged in front of the front fork, and the rotation regulating portion is arranged in front of the sensor mounting section of the bracket so as to cover the fixing section.

5. The supporting structure of a wheel speed sensor according to claim 1, wherein an outer circumferential portion of the wheel speed sensor which makes contact with the rotation regulating portion is formed in parallel with the direction of the axle, and a wall surface of the rotation regulating portion which makes contact with the wheel speed sensor is formed in parallel with the direction of the axle.

6. The supporting structure of a wheel speed sensor according to claim 1, wherein the sensor section is formed in a cylindrical shape and extends in parallel with the direction of the axle, and the bracket includes a sensor mounting hole through which the sensor section passes, and wherein the protection wall is formed of an inner circumferential surface of the sensor mounting hole and covers an inner end in an axial direction of the sensor section.

7. The supporting structure of a wheel speed sensor according to claim 2, wherein the bracket includes a rib which extends radially from a part through which the axle passes and which is formed thicker in the direction of the axle from the outer surface, and the sensor mounting section and the rotation regulating portion are formed in the rib.

8. The supporting structure of a wheel speed sensor according to claim 2, wherein the bracket is configured to carry the axle of a front wheel and support a lower end of a front fork at a rear of the axle, and wherein the wheel speed sensor is arranged in front of the front fork, and the rotation regulating portion is arranged in front of the sensor mounting section of the bracket so as to cover the fixing section.

9. The supporting structure of a wheel speed sensor according to claim 2, wherein an outer circumferential portion of the wheel speed sensor which makes contact with the rotation regulating portion is formed in parallel with the direction of the axle, and a wall surface of the rotation regulating portion which makes contact with the wheel speed sensor is formed in parallel with the direction of the axle.

10. The supporting structure of a wheel speed sensor according to claim 3, wherein an outer circumferential portion of the wheel speed sensor which makes contact with the rotation regulating portion is formed in parallel with the direction of the axle, and a wall surface of the rotation regulating portion which makes contact with the wheel speed sensor is formed in parallel with the direction of the axle.

11. The supporting structure of a wheel speed sensor according to claim 4, wherein an outer circumferential portion of the wheel speed sensor which makes contact with the rotation regulating portion is formed in parallel with the direction of the axle, and a wall surface of the rotation regulating portion which makes contact with the wheel speed sensor is formed in parallel with the direction of the axle.

* * * * *